Patented Aug. 11, 1925.

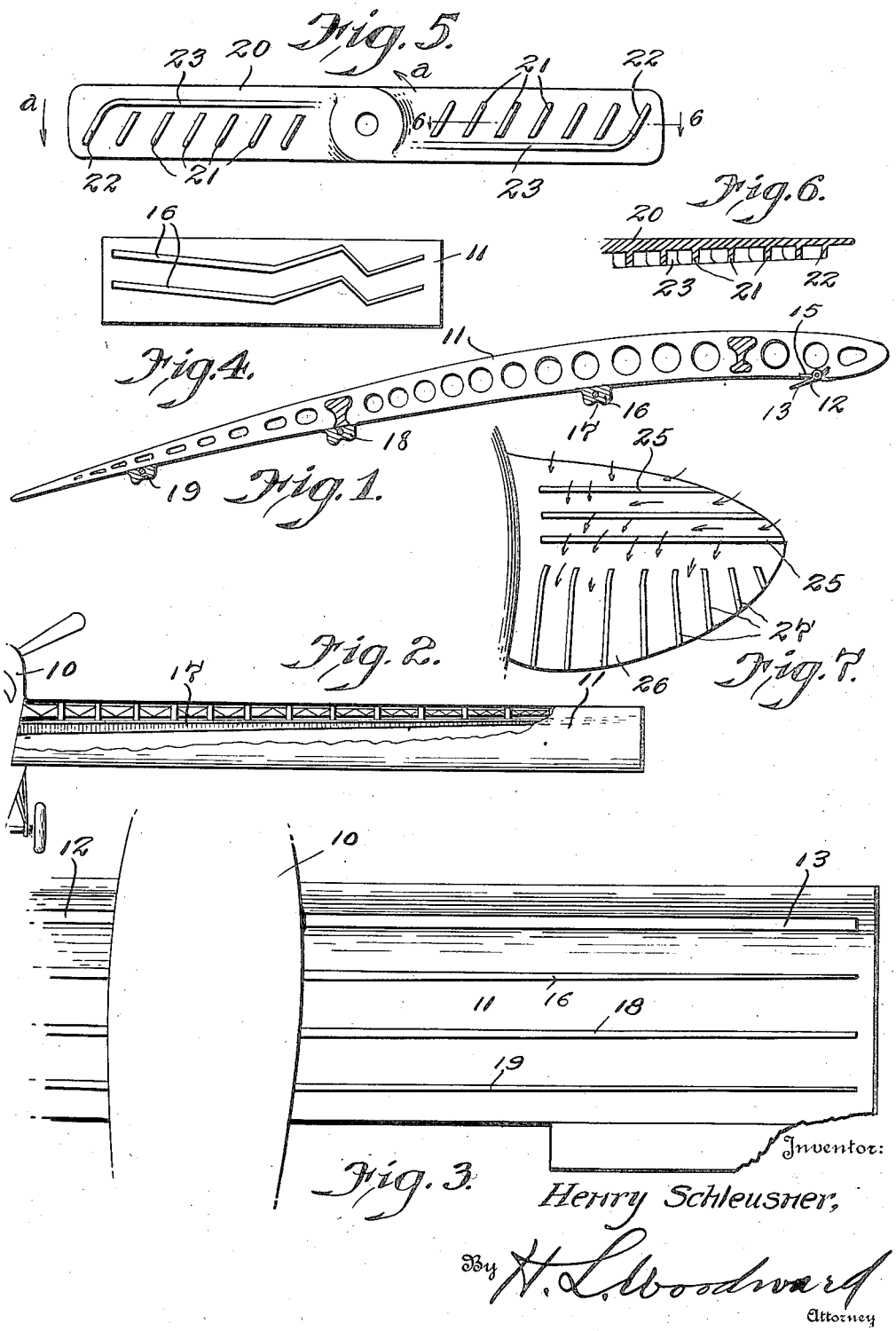

1,549,223

UNITED STATES PATENT OFFICE.

HENRY SCHLEUSNER, OF GARNER, IOWA.

AEROFOIL.

Application filed September 7, 1923. Serial No. 661,484.

*To all whom it may concern:*

Be it known that I, HENRY SCHLEUSNER, a citizen of the United States, residing at Garner, in the county of Hancock and State of Iowa, have invented certain new and useful Improvements in Aerofoils, of which the following is a specification.

The invention relates to aircraft, and particularly to aerofoils, having for its object to effect improvements in details, to attain greater efficiency in sustaining, controlling, and propelling an aircraft.

Investigations have demonstrated that in the flight of aeroplanes the maximum lifting effect is exerted over a limited area adjacent the forward part of the wing, and a similar effect is notable in propellers also. It is an object of my invention to construct a foil so that a high degree of lifting force will be developed throughout its incident surfaces, from front to rear. It is sought to attain this by effecting a development of pressure more equally in the intermediate and rear portions of a wing, comparable in degree to that which is exerted in the forward part.

It is also an object of the invention to provide pressure developing elements which will also function as reinforcements in aeroplanes, adding to their rigidity in a transverse direction. It is also an object to provide a construction of this character which is adapted to use in various aerofoil elements, and may be incorporated upon aeroplanes of the usual type, without requiring modifications in design and manufacture to a radical extent.

Additional objects, advantages and features of invention reside in the construction, arrangement and combination of parts as may be understood from the following description and drawings, in which, Figure 1 is a cross sectional view of an aeroplane wing having my invention embodied thereon, Fig. 2 is a rear view of a wing with parts broken away and shown in longitudinal section, Fig. 3 is a bottom view of a wing constructed in accordance with my invention, Fig. 4 is a view similar to Fig. 3, of a modified form of the device, Fig. 5 is a plan view of a propeller blade constructed in accordance with my invention, Fig. 6 is a fragmentary longitudinal sectional view on the line 6—6 of Fig. 5, in the direction of the arrow.

Fig. 7 is a bottom view of a modified form of device, particularly applicable to aeroplane wings.

There is illustrated a portion of an aircraft 10, including a lateral wing 11. In its general form and construction, the wing may conform to approved practice. Closely adjacent its forward edge, however, in the lower side, there is pivoted a shutter element 12, extending throughout the length of the wing parallel to its forward edge, being pivoted within the body of the wing. The shutter has a wide blade portion 13 which normally extends rearwardly from the pivot and downwardly from the incident surface of the wing. The shutter also has a projection 14 which extends obliquely upward from the blade within the wing, and is engaged by one arm of a spring 15, by which the shutter blade is held outwardly from the wing normally, but will yield to high air pressures resulting from the movement of the craft at high speed. At a distance rearwardly of the shutter 12, upon the under side of the wing, there is formed a raised rib-like element 16, which, to distinguish it from the structural elements of the wing will be termed a ridge. The distance of this ridge 16 from the shutter is an element which may be considered, and is determined by the efficiency of the device for the functions contemplated, as determined by experiments. The ridge 16 extends throughout the length of the wing, although it may be shorter if desired. In Figs. 1 and 3, the ridge is shown as being rectilinear in form, tapered slightly toward its outer end. It is thought desirable to make the ridge about an inch and a half in thickness, more or less, from the incident surfaces of the wing to the outermost part of the ridges in a vertical direction. As shown, the ridge is approximately two inches in width in a fore and aft direction, and is formed with a recess 17 extending longitudinally therein, which functions in a manner to be described. Rearwardly of the ridge 16, there is a second one 18, of similar form but of lesser dimension in cross section, and rearwardly of this again, there is a third ridge 19, which is still smaller in cross section, and may be spaced closer to the one 18 than the space between the ridges 16 and 18. These ridges may also be made deeper at their inner ends, adjacent the body of the craft 10 as may be seen in Fig. 2, from which point outwardly they are gradually diminished in this dimension.

In Fig. 4 there is shown an arrangement of the ridges, in which, instead of being extended rectilinearly in parallel relation to the front edge of the wing, they are extended diagonally upon the under surface of the wing, in zig-zag formation, which may be found advantageous to take advantage of eddies or areas of compression developed by progression of the body 10 of the craft.

In the use of this form of foil, when the craft has attained an elevation, the downward pressure of the shutter 12 will incidently engage the impeding air body which might otherwise fail to exert a lift upon the immediate adjacent forward part of the wing, and not engage with adequate force until an immediate portion of the wing has passed thereover. In order to combat the tendency for this initial engagement of the incident surfaces of the wing with air to be localized, with an area of reduced pressure rearwardly thereof, the ridge 16 will function to create an area of compression immediately thereadjacent, and eddy currents which will react against the surfaces immediately to the rear of the ridge, this effect being repeated successively by the ridges 18 and 19. A similar effect is initially produced by the shutter 12, it will be understood. In the use of this device, it will be found to enable a rapid take-off, and produce high lifting efficiency of especial value in machines carrying heavy loads. The form illustrated in Fig. 4 may be found to have utility in increasing the lifting effect by opposing lateral movement of air which might be produced by the car body of a craft, which would tend to move air outwardly toward the ends of the wings.

In Figures 5 and 6 there is illustrated the application of my invention to a propeller blade. In this instance, a blade 20 is shown which may conform to conventional or approved practice in the construction of screw propellers. Diagonal raised rib elements 21 are formed on the incident surfaces of the propeller, in parallel equally spaced relation, being inclined toward the outer ends of the propeller blade adjacent the advancing edges, but stopping short thereof a suitable distance. An outermost rib element 22 of the series is formed with a continuation 23, which extends longitudinally inward upon the propeller blade a short distance from the diagonal ribs 21 first mentioned and a short distance from the rear edge of the propeller blade, as shown in Fig. 5. The direction of rotation of the propeller is indicated by the arrows $a$ in Fig. 5.

In Figure 7, I have illustrated what may be found a preferable construction, having the object of compressing the air engaged by the wing in a manner to exert new effects, and to then redistribute the air so as to exert a lifting effect over the rear and outer parts of the wing in proportion to the load capacity of the parts upon which its force is exerted.

Here, the wing contemplated would be of slight curvature on the underside fore and aft, and would be provided with a small number of ridges 25 extending from the inner part of the wing to the outer part. The wing is formed with a rearwardly curved forward edge, especially noticeable at the extremity, the rear edge being correspondingly inclined, but swelled intermediately as at 26. The wing has a rounded point, and involves much shorter fore and aft measurement in its outer portion than at the inner part, so that a lighter framing may be employed. The rearmost ridge 25 extends medially of the wing and to the point, while the ridges 25 in advance of the last mentioned, extend to the curved forward edge of the wing, each thereby being progressively shorter than the one behind. In flight, air is forced inwardly before these ridges so that an air cushion, so to speak, is formed before the ridges whereby head resistance thereof is reduced, and air passing the wing rearwardly at right angles to the ridges will be eased over the ridges. Rearwardly of the ridges, there is a series of distributor ridges 27 the forward ends of which stop short of extending closely adjacent the rearmost ridge 25, their forward ends being curved slightly outward toward the tip of the wing, while their rear parts are approximately rectilinear, and arranged in a fan-like order for distributive effect. These ridges are ordinarily made an inch wide and half an inch high at the forward parts, tapering in size toward the rear. The ridges effect redistribution of the air for the purposes mentioned above, and may be combined or associated with other features of structure hereinbefore described, as may be found desirable and practicable.

What is claimed is:—

In a device of the character described, a body member having laterally extending ridge elements on the under side in the forward part each being longer than the one before so that their outer ends project successively one beyond the other, and a multiplicity of ridge elements in the rear part of the body extending rearwardly from adjacent the rearmost of the first mentioned ridges, for distributive effect as indicated.

In testimony whereof I have affixed my signature in presence of two witnesses.

HENRY SCHLEUSNER.

Witnesses:
 A. R. BUTLER,
 G. K. LOCKWOOD.